(12) United States Patent
Cox et al.

(10) Patent No.: US 12,129,020 B2
(45) Date of Patent: Oct. 29, 2024

(54) AIRCRAFT ELECTRIC TAXI SYSTEM DESIGN AND OPERATION

(71) Applicant: Borealis Technical Limited, North Plains, OR (US)

(72) Inventors: Isaiah W. Cox, London (GB); Jan Vana, Prague (CZ); Joseph J. Cox, Portland, OR (US); Yonatan Rotenberg, Miami, FL (US)

(73) Assignee: Borealis Technical Limited, Isle of Man (IM)

( * ) Notice: Subject to any disclaimer, the term of this patent is extended or adjusted under 35 U.S.C. 154(b) by 221 days.

(21) Appl. No.: 17/549,422

(22) Filed: Dec. 13, 2021

(65) Prior Publication Data

US 2022/0126987 A1  Apr. 28, 2022

Related U.S. Application Data

(63) Continuation-in-part of application No. 16/207,118, filed on Dec. 1, 2018, now Pat. No. 11,235,865.

(60) Provisional application No. 62/593,517, filed on Dec. 1, 2017.

(51) Int. Cl.
B64C 25/32  (2006.01)

(52) U.S. Cl.
CPC ............................ B64C 25/405 (2013.01)

(58) Field of Classification Search
CPC ........ B64C 25/405; B64C 25/36; B64C 25/50
See application file for complete search history.

(56) References Cited

U.S. PATENT DOCUMENTS

| | | | | |
|---|---|---|---|---|
| 8,620,493 B2* | 12/2013 | Hughes | ................ | G05D 1/0083 701/25 |
| 8,714,481 B2* | 5/2014 | Sweet | ................... | B64C 25/405 244/100 R |
| 9,751,621 B2* | 9/2017 | Cox | ....................... | B64C 25/405 |
| 2015/0129713 A1* | 5/2015 | Cox | ......................... | B64C 25/50 244/50 |
| 2015/0217861 A1* | 8/2015 | Cox | ......................... | F16D 41/16 301/6.2 |
| 2015/0375854 A1* | 12/2015 | Abel | ...................... | B64C 25/405 244/50 |
| 2016/0025152 A1* | 1/2016 | Klassen | .................. | F16D 11/14 192/69.8 |
| 2016/0122007 A1* | 5/2016 | Cox | ....................... | B64C 25/405 244/50 |

(Continued)

*Primary Examiner* — Joshua J Michener
*Assistant Examiner* — Cindi M Curry

(57) ABSTRACT

A method for designing and operating aircraft nose landing gear wheel-mounted electric taxi systems to move aircraft during ground travel. Electric taxi system components are engineered and sized to produce optimal ground travel torque to move aircraft during the majority of aircraft ground travel and are operated in conjunction with the aircraft steering to turn the nose wheels to an effective angle that moves the aircraft during pushback and in breakaway situations. The nose landing gear wheels are turned to an effective angle and the electric taxi systems are operated simultaneously to get the aircraft moving. After breaking away, the aircraft is driven with electric taxi systems at the optimal ground travel torque in a forward or reverse direction with the nose wheels parallel or in a desired ground travel direction with the nose wheels steered in the desired direction of ground travel.

8 Claims, 3 Drawing Sheets

(56) References Cited

U.S. PATENT DOCUMENTS

2016/0122008 A1* 5/2016 Cox .................. B64C 25/405
 244/50
2016/0185452 A1* 6/2016 Cox .................. B64F 1/002
 244/50
2016/0349752 A1* 12/2016 Fusaro ................ B64F 1/002

* cited by examiner

AIRCRAFT ELECTRIC TAXI SYSTEM DESIGN AND OPERATION

PRIORITY CLAIM

This application is a continuation-in-part of pending U.S. patent application Ser. No. 16/207,118, filed 1 Dec. 2018, which claims priority from U.S. Provisional Patent Application No. 62/593,517, filed 1 Dec. 2017, the entire disclosures of the foregoing being fully incorporated herein in their entireties.

TECHNICAL FIELD

The present invention relates generally to electric taxi systems for moving aircraft independently without operating engines during ground operations and specifically to a method for moving aircraft with electric taxi systems that ensures optimal torque production by the electric taxi systems to move the aircraft during a broad range of ground travel conditions.

BACKGROUND OF THE INVENTION

Electric taxi systems that drive aircraft during ground travel independently without operation of the aircraft's main engines and external tow vehicles have been proposed by Applicant and others. Conventionally, these systems are expected to provide the torque required to drive aircraft nose or main landing gear wheels and to move an aircraft during ground operations. However, the design and operation of conventional electric taxi systems does not necessarily ensure that motors and other components of these systems produce the torque required to move an aircraft equipped with an electric taxi system during a broad range of operational or ground travel conditions. Such operational and ground travel conditions may include both situations when it is difficult to move the aircraft and situations when it is not difficult to move the aircraft or to keep the aircraft moving. Examples of ground travel conditions when it may be difficult to move an aircraft include, inter alia, push back of the aircraft from a gate or parking location and weather or other situations that cause an aircraft to be slowed or stalled during ground travel. Breakaway torque may be needed to get the aircraft moving in these situations.

Motors for electric taxi systems are conventionally designed to provide a larger amount of torque than may actually be required during operation of the electric taxi system to drive the aircraft in most ground travel conditions. This is done to ensure that the electric taxi systems are capable of meeting maximum torque requirements during those ground travel conditions when maximum or breakaway torque is required to move the aircraft. As a result, the design of conventional electric taxi systems focuses on providing motors that will meet the highest torque requirements likely to be needed to move an aircraft during the most difficult aircraft ground travel conditions. Such motors may produce more torque than is actually needed to drive an aircraft during most ground travel and may, in addition, present design and weight challenges for the electric taxi systems and the aircraft landing gear wheels and landing gears where they are installed. The operation of conventional electric taxi systems to optimize torque production by the electric taxi system and ensure that breakaway torque may be effectively produced in ground travel situations requiring this level of torque to get the aircraft moving has not been addressed.

There is a need, therefore, for an alternative approach to designing and operating aircraft electric taxi systems so that these systems have the capability for producing optimal torque to drive aircraft during most ground travel conditions, as well as the capability for producing, in conjunction with operation of the aircraft's nose landing gear wheel steering, torque effective to move the aircraft during challenging ground travel conditions requiring breakaway of the aircraft. There is also a need for an electric taxi system with the foregoing capability that does not pose design and weight challenges or require motors and components that are over-engineered or oversized for operation of the electric taxi system during the majority of ground travel.

SUMMARY OF THE INVENTION

Accordingly, it is a primary object of the present invention to provide an alternative approach to designing and operating aircraft electric taxi systems with motors and other components so that these systems have the capability for producing optimal torque to drive aircraft during a broad range of ground travel conditions and may be operated in conjunction with operation of the aircraft's nose landing gear wheel steering to move the aircraft when maximum or breakaway torque may be required to move the aircraft during challenging ground travel conditions.

It is another object of the present invention to provide an electric taxi system with the foregoing capability that does not pose design and weight challenges or require motors and components that are over-engineered or oversized for operation of the electric taxi system during the majority of ground travel conditions.

It is an additional object of the present invention to provide a method for operating an aircraft nose landing gear wheel-mounted electric taxi system to ensure that torque to break away is produced by the electric taxi system during simultaneous operation with the aircraft nose landing gear wheel steering and to move aircraft in a broad range of ground travel conditions, including those that would require breakaway torque to move the aircraft.

It is a further object of the present invention to provide a method for operating an aircraft nose landing gear wheel-mounted electric taxi system that has a motor that may be engineered and sized to achieve optimal torque to move the aircraft during the majority of ground travel when breakaway torque is not required and for operating the electric taxi system in conjunction with steering the aircraft when breakaway torque would otherwise be required to move the aircraft.

It is yet another object of the present invention to provide a method for operating an aircraft nose landing gear wheel-mounted electric taxi system that may incorporate angles at which the nose landing gear wheels may be turned away from a position parallel to a longitudinal axis of the aircraft into calculations of required maximum torque production by motors and other components of the electric taxi system so that the electric taxi system may be operated simultaneously with the aircraft steering system to produce an optimal level of torque to move the aircraft during any ground travel conditions.

In accordance with the present invention, an aircraft nose landing gear wheel-mounted electric taxi system and a method that facilitates the design and operation of an aircraft nose landing gear wheel-mounted electric taxi system to move an aircraft with optimal torque during a broad range of ground travel conditions are provided. Electric taxi systems may be designed with motors and components engineered and sized to produce optimal torque requirements to move aircraft during the majority of aircraft ground travel conditions. The nose landing gear wheel-mounted electric taxi system may be operated simultaneously in conjunction with operation of the nose landing gear steering as the aircraft is driven to move the aircraft during ground travel conditions when higher maximum and/or breakaway torque may be needed. Correlation of nose landing gear wheel angle when the aircraft's nose landing gear wheels are turned at angles from a longitudinal axis of the aircraft with the level of torque produced by an electric taxi system motor and components may be effectively used to design the electric taxi system motors and components and to operate the electric taxi system to move the aircraft. Turning the nose landing gear wheels through a range of angles may enable the electric taxi system to produce a level of torque that will move an aircraft during breakaway conditions. At other times, the aircraft may be driven by the electric taxi system with the nose landing gear wheels parallel to the longitudinal axis to produce forward or reverse ground travel, or the nose landing gear wheels may be turned in an aircraft direction of ground travel to continue ground travel in that direction at an optimal torque for most electric taxi system-powered aircraft ground travel. Aircraft equipped with the electric taxi systems sized and operated as described herein may be driven at optimal torque levels during a wide range of ground travel conditions requiring different levels of torque to move the aircraft.

Other objects and advantages will be apparent from the following description, drawings, and claims.

DESCRIPTION OF THE INVENTION

Figure 1:
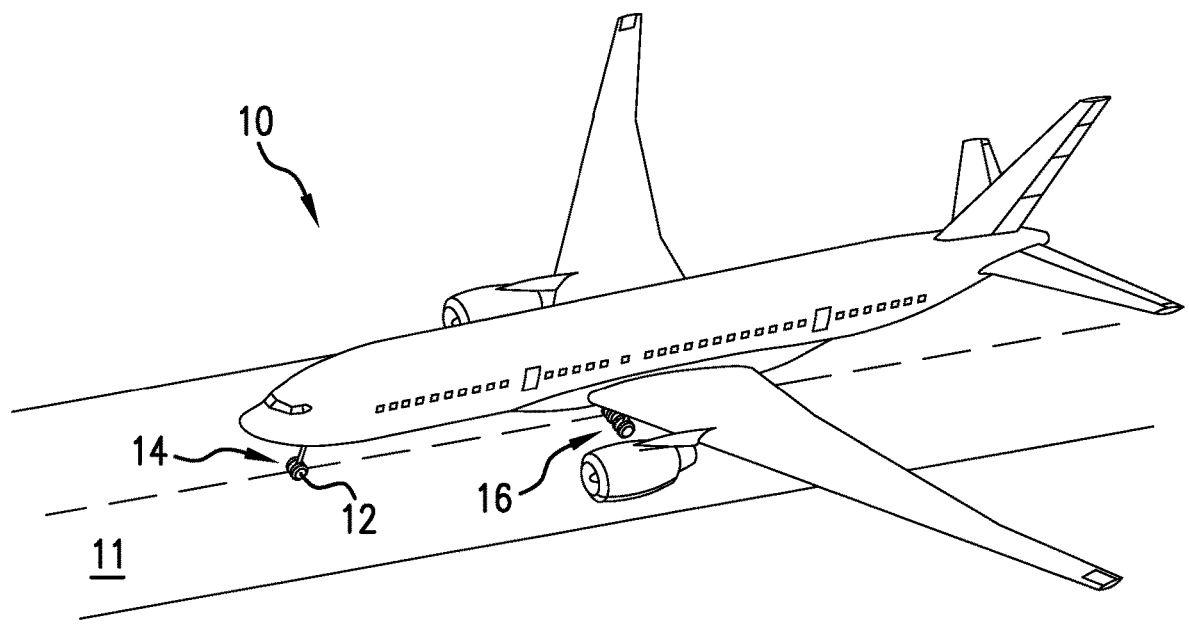
FIG. 1 illustrates an aircraft equipped with nose landing gear wheel-mounted electric taxi systems for ground travel independently of operating engines moving on a runway.

The benefits and advantages of using electric taxi systems to move aircraft during travel on ground surfaces without operating engines and external tow vehicles have been acknowledged. Applicant is developing electric taxi systems that may be designed and operated to efficiently provide the torque required to move passenger and other similarly-sized commercial aircraft during a broad range of different ground travel conditions likely to be encountered as the aircraft are driven with the electric taxi systems between landing and takeoff, including on airport runways and taxiways and into and out of airport terminal ramps with gates and parking locations. Electric taxi systems move aircraft using torque produced by the cooperative action of the electric taxi system components, including torque produced by an electric drive motor. The torque is translated to one or more landing gear drive wheels where the electric taxi system components are mounted to drive the landing gear drive wheels and move the aircraft during ground travel. The maximum torque that the electric taxi system may generate should, ideally, correspond to a maximum level of torque that might be required to move the aircraft in a broad range of ground travel conditions, including those when breakaway torque may be required to get the aircraft moving.

Breakaway torque is typically required to move an aircraft from a stationary or stopped condition, such as at push back. Breakaway torque may also be required to move an aircraft that is cold-soaked, heavy, or otherwise difficult to move. Breakaway torque is usually equivalent to the maximum torque needed to move an aircraft under the foregoing and potentially under other selected ground travel conditions. These ground travel conditions and situations do not occur during most of an aircraft's electric taxi system-powered ground travel, and the level of torque required to move an aircraft with an electric taxi system during the majority of ground travel is much lower than the breakaway or maximum torque needed in these selected ground travel conditions and situations that are infrequently encountered during ground travel. As used herein, "the majority" of ground travel and "most" ground travel refer to all ground travel of an aircraft powered by electric taxi systems between landing and takeoff that does not involve a breakaway situation or condition when the aircraft is stationary and must be moved to continue ground travel. As discussed herein, breakaway situations and conditions may include pushback of an aircraft, an aircraft stalled during ground travel, an aircraft that has stopped and become stationary during ground travel, and the like.

Motors and other components for electric taxi systems are typically designed and sized to generate the maximum torque that may be required to move an aircraft in a breakaway situation. However, this maximum level of torque is not required to move an aircraft with the electric taxi system motor and components during the majority of its ground travel. Consequently, sizing electric taxi system motors and components to produce the infrequently required maximum torque may produce undesirable design and weight consequences for not only the electric taxi system, but also the landing gear drive wheels where the electric taxi systems are mounted, and the aircraft landing gear supporting the electric taxi system. Instead of requiring electric taxi systems to be capable of operating at a maximum or breakaway level of torque on a constant basis, electric taxi systems may be designed and operated to produce an optimal lower level of torque required for the majority of electric taxi system-powered aircraft ground travel and to ensure that the electric taxi system will be able to move the aircraft during these typically infrequent instances. The present method enables the design and operation of an electric taxi system that can meet optimal torque requirements to move an aircraft during most ground travel conditions and that can also be operated in conjunction with operation of the aircraft's hydraulic steering system to steer the nose landing gear wheels and produce torque levels that move the aircraft during breakaway conditions without undesirable design, weight, or other consequences.

Applicant has determined that there is a correlation between the torque and/or linear force required to move an aircraft on a ground surface with an electric taxi system and the angle at which the nose landing gear wheels may be turned from a position parallel to a longitudinal axis of the aircraft. A lower torque is needed to get the aircraft moving when the nose landing gear wheels are turned at a sharp angle than when the nose landing gear wheels are aligned parallel to the longitudinal axis of the aircraft. It was observed that the minimum breakaway torque required to move an aircraft is significantly reduced when the nose landing gear wheels are turned at an angle to one side of the longitudinal axis while the electric taxi systems are operated simultaneously to drive the aircraft. This operation causes the aircraft's main landing gear wheels in positions on the outside of a turning are to break away first. Since only one of the main landing gear wheels breaks away during this maneuver, less torque is required to move the aircraft out of a breakaway situation. Maintaining the nose landing gear wheels in a position parallel to the aircraft's longitudinal axis while trying to move the aircraft with the electric taxi systems requires a higher breakaway torque to get the aircraft moving than when the nose landing gear wheels are angled. Electric taxi systems may be designed with motors and other components that are engineered and sized to produce optimal torque levels required for the majority of electric taxi system-powered aircraft ground travel and that are also capable of producing an effective breakaway torque in the relatively few situations when this level of torque is needed to move the aircraft.

The torque provided by the motors and components of electric taxi systems may be determined and tested in relation to angles at which the nose landing gear wheels are turned as described below. With the method of the present invention, it is possible to design electric taxi systems with motors and components that produce an optimal torque for moving the aircraft during the majority of ground travel conditions likely to be encountered. It is also possible to operate the electric taxi systems simultaneously in conjunction with nose landing gear wheel steering to produce the effective breakaway torque when needed to move the aircraft during push back and during the other limited ground travel breakaway situations.

Referring to the drawings, FIG. 1 shows an aircraft 10 after landing on a runway 11. The aircraft 10 is equipped with an electric taxi system 12 controllable by a pilot or crew of the aircraft to drive the aircraft on the ground. An electric taxi system is preferably located in each one of a pair of nose landing gear wheels 14. Only one nose landing gear wheel 14 is visible in FIG. 1. The pilot-controlled aircraft electric taxi systems developed by the inventors of the present invention may be mounted completely within each of the aircraft's nose landing gear wheels, so that each of the nose landing gear wheels equipped with an electric taxi system functions as a drive wheel. The aircraft's main landing gear wheels visible in FIG. 1 are indicated at 16. It is contemplated that electric taxi systems may also be located in one or more of the main landing gear wheels 18.

Figure 3:
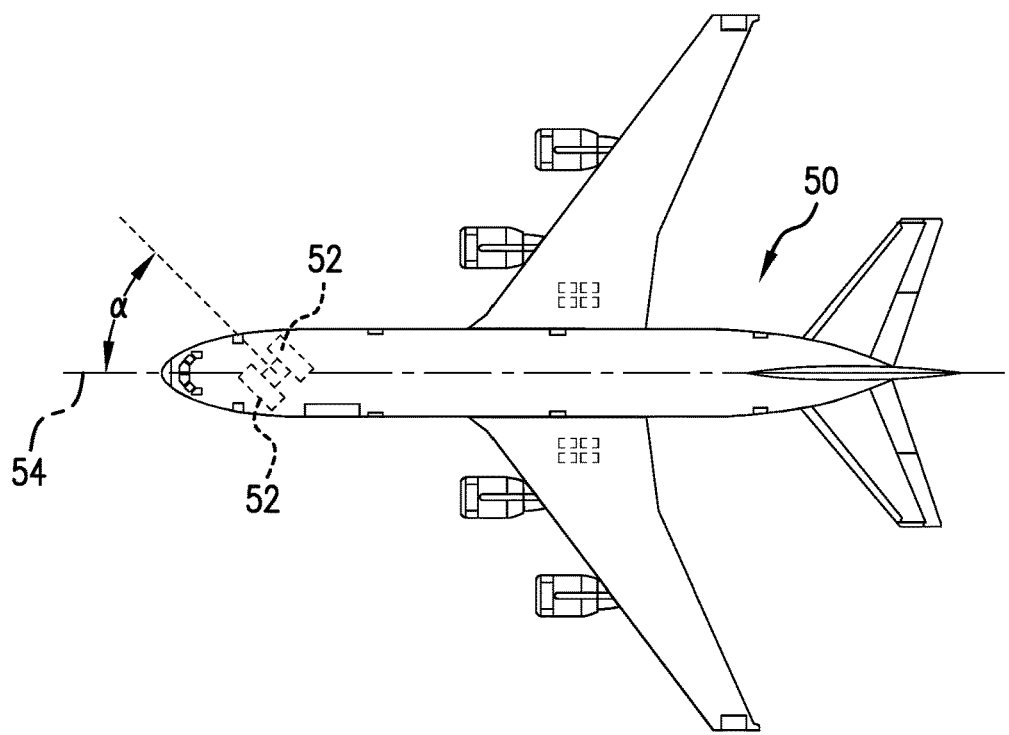
FIG. 3 is a diagrammatic top view of an aircraft equipped with electric taxi systems in each one of a pair of nose landing gear wheels showing one possible nose wheel steering angle useful for moving aircraft with simultaneous operation of the electric taxi systems during electric taxi system-powered pushback and ground travel breakaway situations.

The aircraft 10 is shown on the runway 11 with the nose landing gear wheels 14 positioned parallel to the aircraft's longitudinal axis (54 in FIG. 3). The runway 11 shown in FIG. 1 provides a linear travel path for the aircraft 10. When the aircraft 10 is driven along a linear path during forward and reverse ground travel, the nose landing gear wheels will be maintained in this parallel position. Not all aircraft ground travel between landing and takeoff follows a linear path. Aircraft may be required to turn to the right or left during ground travel maneuvers on runways and in airport ramp or apron areas to follow a non-linear, curved travel path during some portions of ground travel. In these instances, a pilot of the aircraft will use the steering system to turn the aircraft's nose landing gear wheels in the direction of ground travel. When a breakaway situation is encountered during such ground travel, the pilot will not turn the nose landing gear wheels to a parallel position after breakaway, but will keep them turned and steer the aircraft in the ground travel direction along a non-linear ground travel path. The method of the present invention uses the steering system to turn the nose landing gear wheels to an angle that will move the aircraft out of breakaway situations during ground travel when aircraft are turning and traveling along a non-linear travel path, as well as when aircraft are following a linear travel path.

Each electric taxi system 12 may include at least an electric motor designed to generate sufficient torque to power the nose landing gear drive wheel within which it is mounted and to move the aircraft at a range of desired torques and speeds during a broad range of ground operations and components including a gearing or other type of drive system and a clutch or other torque transfer system controllable to selectively transfer an optimal torque required to power the drive wheel through the electric taxi system and to drive the aircraft along linear and non-linear travel paths on the runway 11, within an airport ramp or apron area, or on another ground travel surface.

Figure 2:
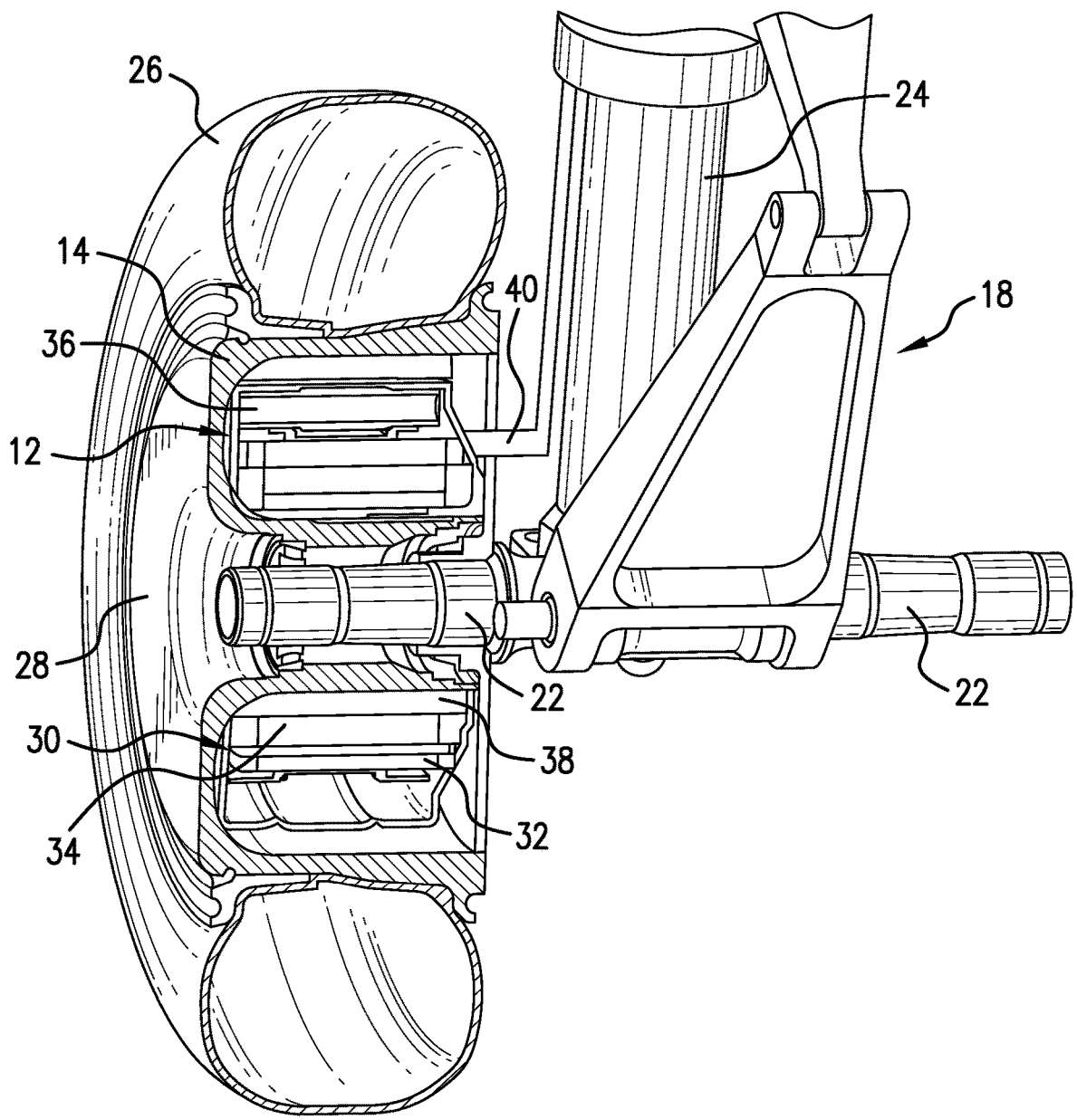
FIG. 2 illustrates one embodiment of an electric taxi system that may be designed and operated according to the present invention mounted within an aircraft nose landing gear wheel.

FIG. 2 illustrates a perspective cross-sectional schematic view of one embodiment of an electric taxi system 12 that may be designed and sized to produce optimal torque to move an aircraft during a majority of ground travel conditions in accordance with the present invention. The electric taxi system 12 is shown mounted completely within an aircraft nose landing gear wheel 14 supported on an aircraft nose landing gear 18. The components of the electric taxi system are shown diagrammatically and partially in cross-section relative to each other and to the nose landing gear wheel 14. An optimal design for an electric taxi system may employ other arrangements of these or functionally equivalent electric taxi system components, and this is contemplated to be within the scope of the present invention.

The nose landing gear wheel 14 is shown rotatably mounted on an axle 22. A second nose landing gear wheel (not shown), which is a mirror image of the nose landing gear wheel 14, will also be rotatably mounted on a second axle 22 supported on the nose landing gear 18. Each axle 22 may be attached to a conventional nose landing gear strut 24 at an inboard extent. The wheel 14 supports a tire 26. An outboard wheel hub section 28 may be positioned at an outboard extent of the nose landing gear wheel 14 and the axle 22. All of the components of the electric taxi system 12 may be housed completely within the volume of the wheel 14 as shown.

In the electric taxi system embodiment shown in FIG. 2, an electric drive motor 30, preferably with a rotor element 32 and a stator element 34, may be mounted in a portion of the wheel 14 adjacent to the axle 22. A gear system 36 may be positioned outwardly of the drive motor 30 to provide torque transfer and speed change functions. The gear system 36 may be replaced by a roller traction drive or equivalent system. A clutch assembly 38 may be positioned within the landing gear wheel 14 to connect the wheel 14 to the drive motor 30 through the gear system 36 and transfer torque during operation of the electric taxi system. The clutch assembly 38 may be activated automatically or manually to engage and disengage the gear or drive system 36 into and out of actuation with the drive motor 30 and wheel 14, as required, so that the electric taxi system 12 may power and drive the nose landing gear wheel 14 and move the electric taxi system-equipped aircraft on an airport ground surface.

Electric power to operate the electric drive motor 30 in the electric taxi system may be provided to the electric drive motor by a wire harness 40 or like wiring connection to a source of electric power. For example, the wire harness 40 may be connected to a supply of electric power located within the aircraft, such as the aircraft's auxiliary power unit (APU), batteries, or another source of electric power capable of meeting the power supply demands for an electric taxi system designed to generate the levels of optimal and effective breakaway torque described herein.

FIG. 3 is a diagrammatic top view of an aircraft 50 equipped with electric taxi systems in both nose landing gear wheels 52. A nose wheel steering angle effective to move the aircraft 50 in a breakaway situation when the electric taxi systems are operated simultaneously with the nose landing gear wheel steering turning the nose wheels to this steering angle is shown. The nose landing gear wheels 52, which are exaggerated and not drawn to scale for purposes of illustration, are each equipped with an electric taxi system (not shown), such as that illustrated in FIG. 2, and are shown turned at an angle α from the longitudinal axis of the aircraft, represented by dashed line 54. As noted above, Applicant has determined that turning the nose landing gear wheels to an identified angle relative to the aircraft longitudinal axis 54, preferably a sharp angle as defined herein, with the simultaneous operation of electric taxi systems with drive motors designed and sized to produce a level of torque significantly below the level of breakaway torque otherwise required, will get the aircraft moving during a breakaway situation. The aircraft may then continue ground travel in a desired direction with the nose landing gear wheels steered in this direction or in a forward or reverse direction with the nose landing gear wheels turned parallel to the aircraft's longitudinal axis.

The torque produced by the electric taxi system during operation of the system to move the aircraft when the nose landing gear wheels are turned at the angle α may be effectively doubled over the torque that the electric taxi system motor would produce when the nose landing gear wheels are positioned parallel to the aircraft axis 54. Previously, electric taxi systems had to be designed to produce breakaway or maximum levels of torque at all times during operation of the electric taxi system to drive the aircraft on the ground, even when this high level of torque was not required. The present system and method enable the design and operation of electric drive motors and associated components in nose landing gear-mounted electric taxi systems that produce a lower level of torque that is optimal for the majority of aircraft ground movement. These electric taxi systems may be operated in conjunction with nose landing gear wheel steering during breakaway situations to produce an effective breakaway torque as described above only when actually needed to get the aircraft moving out of the breakaway situation.

To illustrate, if an electric taxi system must produce about 2,000 pound feet (lb ft) or 2,712 Newton meters (Nm) of torque to move an aircraft during most ground travel conditions, but must also be capable of delivering about 4,000 lb ft (5,423 Nm) when a maximum or breakaway amount of torque is required, the current design of an electric taxi system requires the system to deliver the 4,000 lb ft (5,423 Nm) amount of torque during all electric taxi system-powered ground travel. Now, electric taxi systems may be designed so that the electric motor and gearing or other drive system are required to reliably deliver the lower amount of optimal torque needed for most aircraft ground travel. For example, these electric taxi systems may be engineered and sized to produce about 2,000 lb ft (2,712 Nm) of torque when the aircraft is driven along a linear travel path with the nose landing gear wheels 52 parallel to the longitudinal axis 54 of the aircraft and when the nose landing gear wheels are steered to drive the aircraft in a desired or required travel direction along a nonlinear travel path. The electric taxi drive system drive motor is not required to produce the higher level of torque (4,000 lb ft or 5,423 Nm) required to get an aircraft moving from a stopped or similar condition. A stopped aircraft can be moved when the nose landing gear wheels are turned with the aircraft steering simultaneously with the operation of an electric taxi drive system engineered and sized to produce about 2,000 lb ft (2,712 Nm) of torque. As noted above, less torque is actually needed to move an aircraft out of a breakaway condition when an electric taxi system, engineered and sized as described, is operated simultaneously with the nose landing gear wheels steered to an angle that will get the aircraft moving. The exact effective breakaway level of torque required to get a stopped aircraft moving may vary somewhat, depending on the kind of aircraft. It is contemplated that electric taxi systems may be engineered and sized to produce other levels of effective breakaway torque during simultaneous operation with turned nose landing gear wheels in accordance with the present invention.

The sharp angle α at which the nose landing gear wheels are turned from the aircraft longitudinal axis 54 to achieve these results may vary over a range of angles from about 1 degree to about 90 degrees from the aircraft longitudinal axis 54, with the maximum sharp angle α corresponding to the maximum steering angle for a specific aircraft nose landing gear steering system. The effective torque scaling will depend on the specific angle α at which the nose landing gear wheels are turned from the longitudinal axis 54 and may be outside the foregoing range in a particular ground condition or ground travel situation. The direction in which the nose landing gear wheels are turned away from a position parallel to the aircraft longitudinal axis may depend on the ground travel situation in which the breakaway situation is encountered and the aircraft's direction of travel when the breakaway situation is encountered. It is contemplated that a pilot driving the aircraft with the nose landing gear wheel-mounted electric taxi systems described herein may turn the nose landing gear wheels with the nose wheel steering to the right or to the left through the described range of angles to find a sharp angle and a direction that produce a sufficient level of effective breakaway torque to get the aircraft moving as the electric taxi systems are operated to drive the aircraft. An experienced pilot may use trial and error and may even be able to "feel" the angle that will most effectively move the aircraft out of a particular breakaway situation or during pushback with the operating electric taxi systems.

Once the aircraft has broken away and moved out of a breakaway situation or started pushback, the pilot may keep the nose landing gear wheels turned or move them to the parallel position described herein, depending on the specific breakaway situation. For example, if the breakaway situation occurs when the pilot is steering the aircraft to maneuver it along a nonlinear travel path, the nose landing gear wheels may not need to be turned The situations and ground travel conditions requiring an electric taxi system to deliver the effective breakaway torque levels referred to above to move an aircraft may include push back from a gate or parking location and when the aircraft is stopped or stationary for other reasons. This may occur during cold weather, when an aircraft is heavy, and when the aircraft does not move easily, for whatever reason. In the event of a slow or stalled breakaway, the electric taxi system is more effective in breaking away when the nose landing gear wheels are turned at a sharp angle α within the range of about 1 to 90 degrees from the aircraft longitudinal axis 54 as described. Effective breakaway torque required for pushback or any other breakaway situation may be produced by the electric taxi systems by turning the nose landing gear wheels with the aircraft steering to a sharp angle as described above, simultaneously operating the electric taxi systems, and allowing the aircraft to move its nose a few feet to the side when starting off with the operating electric taxi systems. The foregoing process contrasts with current push back procedures, which are conducted with the nose landing gear wheels aligned parallel to the aircraft's longitudinal axis 54. Current pushback procedures require more torque from the electric taxi system to move the aircraft when the nose landing gear wheels are aligned parallel to the aircraft's longitudinal axis than when the nose landing gear wheels are turned to a sharp angle as described above and shown in FIG. 3.

Once the maximum or breakaway torque and the optimal torque for the majority of ground travel conditions are determined for electric taxi system-powered ground travel in a specific kind of aircraft, the electric taxi system motor and components may be designed and sized to reliably produce about half or slightly more than half of the maximum level of torque likely to be required to move the aircraft during the most challenging breakaway and ground travel situations. The effective torque output of the electric taxi system motor may be tested by correlating the specific nose landing gear wheel angle from the aircraft longitudinal axis that is required for an electric taxi system to move the aircraft when the electric taxi system is operated simultaneously with the nose landing gear wheels turned at the specific angle. When the appropriate effective nose landing gear angle has been determined, pilots of the electric taxi system-powered aircraft may be instructed to turn the nose landing gear wheels to this effective angle and to maintain the effective angle while the electric taxi system is simultaneously controlled to move the aircraft during pushback and other breakaway situations. After the aircraft has broken away and can move, if the aircraft is to be moved in a forward or reverse direction, for example during pushback, the pilot may turn the nose landing gear wheels so that they are parallel to the aircraft axis. If the broken away aircraft is to be steered during ordinary ground travel maneuvers, the pilot may turn the nose landing gear wheels to a steering position that corresponds with the desired direction of aircraft travel. and In both situations, after breakaway, the electric taxi system will produce the lower level of optimal torque needed to move the aircraft during the majority of ground travel conditions.

Figure 4:
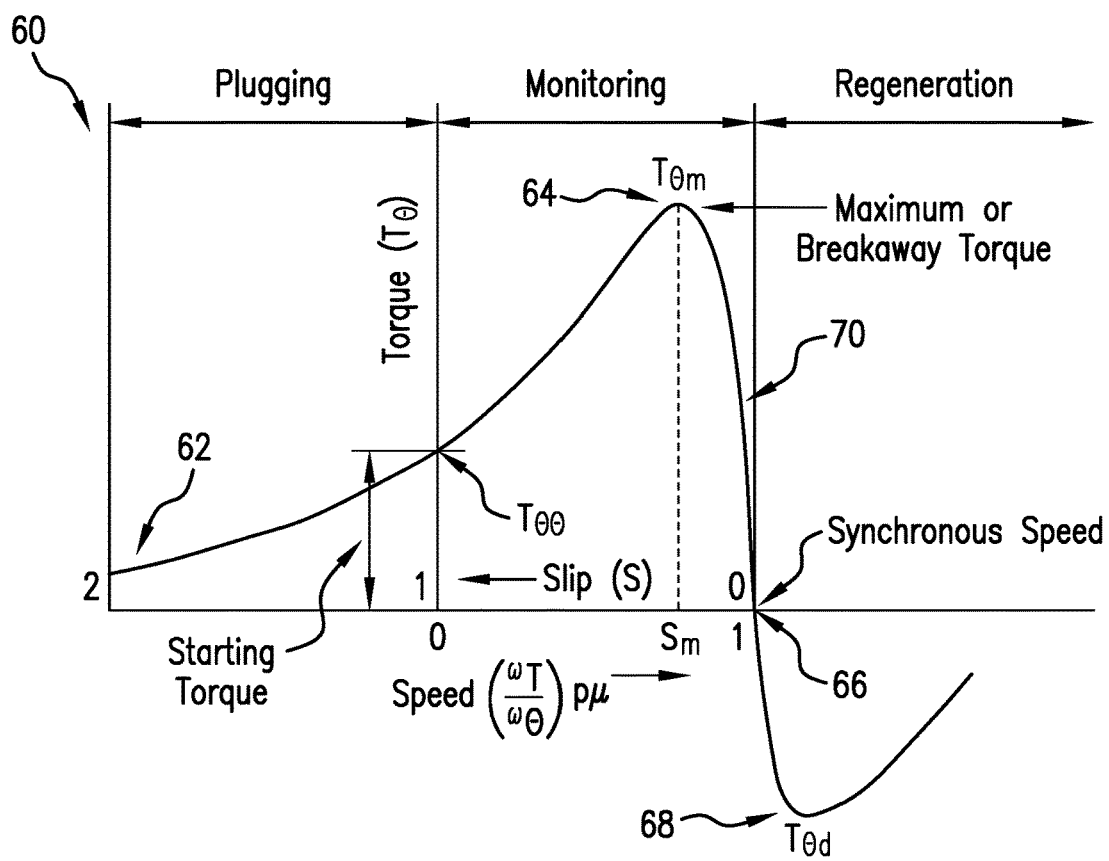
FIG. 4 is a graphical representation of torque considerations during aircraft ground movement powered by nose landing gear wheel-mounted electric taxi systems.

FIG. 4 presents a graphical representation of torque considerations during aircraft ground movement in aircraft powered by electric taxi systems and illustrates a torque/speed curve for an electric drive motor that is controllable to produce optimal torque, as well as traction control, which may be an issue in breakaway situations. Both the electric drive motor selected to power an electric taxi system and drive an aircraft and its load may be described by their torque/speed curves and their inertia. Normal steady state operation occurs at the point where torque supplied by the electric drive motor equals the torque consumed by the load. Any difference between torque supplied and torque consumed means that speed must change. The rate of speed change is determined by the torque difference and the connected inertia.

FIG. 4 illustrates an exemplary torque/speed curve 60 for a high efficiency induction electric drive motor. This type of motor may be mounted within an aircraft nose landing gear wheel, as shown in FIG. 2, and may be effectively operated to power an electric taxi system and drive the aircraft nose landing gear wheel. It can be seen from FIG. 4 that the torque/speed curve starts at a negative speed at 62, reaches a peak 64 at maximum or breakaway torque or speed, drops roughly linearly to zero at synchronous speed, represented at 66, and then falls asymptotically to zero again at 68. Such motors produce nominal full torque at about 50 revolutions per minute (RPM) below the synchronous speed, and the essentially linear output torque is the difference between synchronous speed and actual speed. Peak torque is generally 2 to 3 times the nominal operating torque; generally regeneration peak torque is not equal to motoring peak torque. The torque/speed curve of FIG. 4 is a steady state approximation with its own dynamics.

An electric motor torque/speed curve is directly controlled by electrical operating parameters, including, for example, drive frequency and drive voltage, preferably through an inverter in communication with the electric drive motor. Drive frequency sets motor synchronous speed, and the inverter directly controls the drive frequency. The synchronous speed is the speed at which the drive motor's torque falls through zero, as shown at 66 in FIG. 4. Above the synchronous speed, the drive motor actually acts as a generator and produces a negative or braking torque. This can introduce an important failure mode, since extensive regeneration will cause DC rail voltage to increase, and inverter components can be damaged. The drive voltage sets motor magnetic flux density, which sets the magnitude of the curve. An induction electric drive motor has a characteristic torque/speed curve that stays relatively constant in overall shape. Setting the synchronous speed sets where this curve crosses the speed axis, and the applied voltage acts as a scale factor on this curve. Magnetic flux density can adjust the torque scale, and synchronous speed slides the curve from side to side.

Because a motor torque/speed curve is controlled by two parameters, generally any specific single value of torque and single value of speed is a member of a family of different torque/speed curves. As a result, operating voltage can be traded for slip. The difference between speed of the electric drive motor's rotor (32 in FIG. 2) and synchronous speed is identified as rotor slip and is expressed as a fraction of synchronous speed or as rotor slip frequency and expressed in Herz (Hz) or in radians per second. Normal electric drive motor operation generally uses a rotor slip frequency of less than 2 to 3 Hz, which indicates operation in the nearly linear region 70 of the torque/speed curve of FIG. 4 between breakaway torque and synchronous speed. Ideally, a torque/speed curve can be predicted, given different drive voltage and frequency inputs and motor state inputs, including temperature and the like. The method of the present invention can use this information in connection with information relating to electric drive motor torque output produced when an aircraft's nose landing gear wheels are turned at a sharp angle demonstrated to effectively move the aircraft during pushback or out of a breakaway situation while the aircraft is driven simultaneously with the electric taxi systems to facilitate the design and testing of electric taxi system motors and components.

In addition to facilitating design and operation of drive motors and other components for electric taxi systems when motor torque output is combined with turned aircraft nose landing gear wheels to move the aircraft during pushback and breakaway situations, the techniques for reducing torque of the present method may also be employed to improve effective traction between the aircraft wheels and ground surfaces. Less force needs to translate from tires on the wheels to the tarmac or other ground surface, and reducing the tractive effort is shown to improve traction. In a situation in which one or both wheels try to break away from the ground surface, the method proposed herein may reduce torque so that the aircraft does not break away. Instead of reducing the torque needed, traction may be improved as the pilot moves the aircraft with the nose landing gear wheels turned.

The present method additionally contemplates operating the nose landing gear wheel-mounted electric taxi systems engineered as described herein when a ground travel condition or situation is encountered that may require the higher breakaway or maximum torque to move an aircraft, particularly one that does not have a torque sensor on board. In this method of operation, the nose landing gear wheels with the electric taxi drive systems will be positioned parallel to the aircraft longitudinal axis, and the electric taxi systems will be activated and powered to drive the aircraft with the nose landing gear wheels parallel. If the torque produced by the electric taxi systems does not cause the aircraft to break away, the nose landing gear wheels may then be turned to an effective sharp angle from the longitudinal axis, and the electric taxi systems may be simultaneously operated to drive the aircraft. If the angle initially selected is not effective to move the aircraft, the landing gear wheels may be turned to a greater angle before trying to move the aircraft, and this process may be repeated until the wheels are turned to an effective sharp angle that allows the aircraft to break away. Once the aircraft is able to move, the landing gear wheels may be turned parallel to the longitudinal axis, and the aircraft may be driven in forward or reverse directions to pushback or continue ground travel along a linear path. Alternatively, the landing gear wheels may be steered in a desired aircraft travel direction, and the aircraft may be driven in the desired travel direction after breakaway. In either case, with the electric taxi systems will be operating at the lower optimal ground travel torque described above. The foregoing process may be particularly useful in situations when sideways and off-track movement of an aircraft should be minimized.

The method described herein facilitates design and operation of drive motors and components for nose landing gear wheel-mounted electric taxi systems capable of producing a torque that will meet lower torque requirements for the vast majority of aircraft ground travel conditions, as well as effective torque requirements for breakaway situations when operated simultaneously and in conjunction with the aircraft nose landing gear wheel steering, and has been described with respect to preferred embodiments. Other, equivalent, processes and structures are also contemplated to be within the scope of the present invention.

INDUSTRIAL APPLICABILITY

The present method facilitates the design and operation of motors and components for aircraft electric taxi systems capable of producing an optimal torque that will meet requirements for the vast majority of aircraft ground travel conditions and will also move at aircraft at effective torque requirements for breakaway situations when operated in conjunction with operation of the aircraft steering at specific angles and will find its primary applicability in the design and operation of aircraft electric taxi systems to ensure that electric taxi systems and electric taxi drive motors and system components are optimally sized and operated to produce torque required during a broad range of aircraft ground travel conditions powered by the electric taxi systems.

The invention claimed is:

1. A method for moving an aircraft equipped with pilot-controlled landing gear wheel-mounted electric taxi drive systems designed to produce a torque effective to drive the aircraft during a majority of aircraft ground travel at an airport and moving the equipped aircraft during infrequent breakaway ground travel situations with the pilot-controlled landing gear wheel-mounted electric taxi drive systems operating in conjunction with the equipped aircraft steering system, comprising:

a. providing an aircraft equipped with nose landing gear wheel-mounted pilot-controlled electric taxi drive systems comprising at least electric drive motors designed and sized to produce a level of torque effective to move the equipped aircraft during the majority of electric taxi drive system-powered ground travel, the level of effective ground travel torque limited to less than a level of breakaway torque required to move the equipped aircraft during a breakaway situation, and providing a steering system in the equipped aircraft operable by a pilot to turn the nose landing gear wheels in a selected direction through a range of angles with a longitudinal axis of the aircraft comprising angles from about 1 degree to about 90 degrees;

b. during the majority of electric taxi drive system-powered ground travel of the equipped aircraft at the airport, operating the pilot-controlled electric taxi drive systems and moving the equipped aircraft with the electric taxi drive systems at the level of ground travel torque that moves the equipped aircraft with the nose landing gear wheels positioned parallel to the longitudinal axis of the equipped aircraft;

c. during a breakaway situation when the equipped aircraft is not moving or has stopped moving, simultaneously operating the electric taxi drive systems and turning the nose landing gear wheels with the steering system from the parallel position through the range of angles to an identified angle within the range of angles that effectively causes the equipped aircraft to move out of the breakaway situation, and moving the equipped aircraft out of the breakaway situation with the simultaneously operating electric taxi drive systems and the nose landing gear wheels turned to the identified effective angle; and d. when the equipped aircraft has broken away, operating the steering system and turning the nose landing gear wheels of the broken away equipped aircraft from the identified effective angle to the parallel position or to a position that steers the equipped aircraft in a desired direction of ground travel, and continuing to move the equipped aircraft with the nose landing gear wheels turned to the parallel position or to the desired direction of ground travel while simultaneously operating the electric taxi drive systems at the level of ground travel torque effective to continue to move the equipped aircraft during the majority of ground travel at the airport.

2. The method of claim 1, wherein when the breakaway ground travel situation comprises pushback of the equipped aircraft, turning the nose landing gear wheels with the steering system through the range of angles to the identified effective angle that moves the equipped aircraft out of the breakaway situation in a pushback direction when the electric taxi drive systems are operating simultaneously with the nose landing gear wheels turned to the identified effective angle, continuing to move the equipped aircraft with the operating electric taxi drive systems in the direction of the turned nose landing gear wheels, and causing the equipped aircraft to breakaway, then turning the nose landing gear wheels from the effective angle to the position parallel to the longitudinal axis of the aircraft and continuing to move the aircraft along a forward or a reverse pushback travel path with the nose landing gear wheels in the parallel position and the operating electric taxi drive systems producing the level of ground travel torque effective to continue to move the equipped aircraft during pushback.

3. The method of claim 1, wherein when the breakaway ground travel situation comprises a stationary, stalled, or difficult to move situation, turning the nose landing gear wheels with the steering system through the range of angles to the identified effective angle that causes the equipped aircraft to start moving out of the stationary, stalled, or difficult to move breakaway situation when the electric taxi drive systems are operating simultaneously with the nose landing gear wheels turned to the identified effective angle, continuing to move the equipped aircraft with the operating electric taxi drive systems in the direction of the turned nose landing gear wheels, and causing the equipped aircraft to breakaway, then turning the nose landing gear wheels from the identified effective angle to the position parallel to the longitudinal axis of the aircraft and continuing to move the aircraft in a forward or a reverse direction along a linear ground travel path with the nose landing gear wheels in the parallel position and the operating electric taxi drive systems producing the level of ground travel torque effective to keep the equipped aircraft moving along the linear ground travel path.

4. The method of claim 1, wherein when the desired direction of ground travel of the equipped aircraft comprises a non-linear ground travel path, turning the nose landing gear wheels with the steering system to an angle corresponding to the desired direction of ground travel and continuing to move the equipped aircraft in a forward direction along the non-linear ground travel path with the simultaneously operating electric taxi drive systems producing the level of ground travel torque effective to keep the equipped aircraft moving along the non-linear ground travel path.

5. The method of claim 1, further comprising determining the level of ground travel torque required to move a specific kind of equipped aircraft during the majority of ground travel of the specific kind of equipped aircraft at an airport and providing an electric drive motor designed and having a size to produce the determined level of ground travel torque for moving the specific kind of equipped aircraft during the majority of its electric taxi drive system-powered ground travel, wherein the determined level of ground travel torque comprises about half of a breakaway level of torque required to move the specific kind of equipped aircraft in breakaway situations when the nose landing gear wheels of the specific kind of equipped aircraft are maintained in a position parallel to a longitudinal axis of the equipped aircraft.

6. The method of claim 5, further comprising determining a specific nose landing gear wheel effective angle from the longitudinal axis that produces a torque effective to move the specific kind of equipped aircraft out of a breakaway ground travel situation when the electric taxi drive system is operated simultaneously to move the specific kind of equipped aircraft with the nose landing gear wheels turned to the specific angle.

7. The method of claim 6, further comprising instructing pilots of the specific kind of equipped aircraft encountering the breakaway ground travel situation to turn the nose landing gear wheels to the determined specific nose landing gear wheel effective angle that produces the torque effective to move the specific kind of equipped aircraft out of the breakaway situation and to maintain the nose landing gear wheels at the determined specific effective angle while simultaneously operating the electric taxi drive systems and moving the specific kind of equipped aircraft until the aircraft has broken away, then to turn the nose landing gear wheels with the steering system in a direction for continued ground travel or pushback, and to continue to move the specific kind of equipped aircraft with the electric taxi drive systems producing the level of ground travel torque effective for the majority of ground travel for the specific kind of equipped aircraft.

8. An aircraft nose landing gear wheel-mounted electric taxi drive system designed to produce a level of ground travel torque required to move an aircraft equipped with the designed electric taxi drive systems during a majority of electric taxi drive system-powered aircraft ground travel and to be operated in conjunction with an aircraft steering system to move the equipped aircraft out of infrequent breakaway ground travel situations, comprising:

a. an aircraft equipped for pilot-controlled ground travel with a pilot-controllable electric taxi drive system mounted completely within each wheel of a pair of nose landing gear wheels, each said electric taxi drive system having components comprising at least an electric drive motor with a rotor element and a stator element, a clutch assembly connecting said electric drive motor to said nose landing gear wheel, and a gear system;

b. said electric taxi drive systems being designed and sized to produce a level of ground travel torque effective to move said equipped aircraft during the majority of electric taxi drive system-powered ground travel along a linear or non-linear ground travel path, said level of effective ground travel torque being about half of a level of breakaway torque required to move said equipped aircraft with said nose landing gear wheels positioned parallel to a longitudinal axis of said equipped aircraft during a breakaway situation;

c. said equipped aircraft being further equipped with a nose landing gear wheel steering system operable by a pilot of said equipped aircraft to turn said pair of nose landing gear wheels in a selected direction through a range of angles with said equipped aircraft longitudinal axis comprising angles from about 1 degree to about 90 degrees; and d. said electric taxi drive systems being operable simultaneously with said pilot-operable nose landing gear steering and said landing gear wheels turned to an identified angle in said range of angles effective to move said equipped aircraft out of a breakaway ground travel situation when said landing gear wheels are maintained at said identified effective angle while said electric taxi drive systems are operating.

* * * * *